United States Patent Office 3,794,684
Patented Feb. 26, 1974

3,794,684
ACYLATION OF 2,6-DIOXIMINOCYCLOHEXA-
NONE AND THE MONOSODIUM SALT
THEREOF
Tucker T. Yee, Wilmington, Del., assignor to Atlantic
Richfield Company, New York, N.Y.
No Drawing. Original application July 3, 1969, Ser. No.
839,061, now abandoned. Divided and this application
Nov. 19, 1971, Ser. No. 200,513
Int. Cl. C07c 119/00
U.S. Cl. 260—566 AE                                    2 Claims

ABSTRACT OF THE DISCLOSURE

Method for the acylation of 2,6 - dioximinocyclohexanone and the monosodium salt thereof by the use of either a ketene or a carboxylic acid anhydride in the absence of catalyst.

CROSS REFERENCE TO RELATED APPLICATION

This application is a division of my application Ser. No. 839,061, filed July 3, 1969, now abandoned entitled Acylation of 2,6-Dioximinocyclohexanone and the Monosodium Salt Thereof.

BACKGROUND OF THE INVENTION

Field of the invention

This invention relates to the use of ketene, substituted ketenes, alkyl carboxylic acid anhydrides or aryl carboxylic acid anhydrides to acylate 2,6-dioximinocyclohexanone or the monosodium salt thereof in the absence of catalytic compounds.

Prior art

It is well known that the alpha-amino carboxylic acid, lysine, is an important component of animal and vegetable proteins. Because of its nutritional importance many attempts have been made to synthesize this compound. Two patents showing this synthesis are U.S. 2,999,875 (1961) to Ferris et al. and 3,059,018 to Johnson et al. (1962). In this synthesis cyclohexanone is nitrosated to give the 2,6 - dioximinocyclohexanone if the nitrosation is carried out with methyl nitrite and hydrogen chloride. If, however, sodium nitrite and aqueous methanol is admixed with the cyclohexanone and glacial acetic acid is added slowly there will be formed the monosodium salt of the 2,6 - dioximinocyclohexanone. In the aforementioned patents acylation of the dioximinocyclohexanone was carried out utilizing a variety of well known acylating agents such as the acid chlorides, sulfonyl chlorides and the like in the presence of an aqueous base or by the use of acetic anhydride and concentrated sulfuric acid. In the former case the acylation with attendant ring cleavage produces 5 - cyano - 2 - oximinovaleric acid which, in turn, is converted to lysine by reduction. When using acetic anhydride and concentrated sulfuric acid there was produced the 2,6 - diacetoximinocyclohexanone. The cleavage of the ring of this compound is then carried out, for example, by the use of sodium ethoxide in ethanol to give ethyl 5 - cyano - 2 - oximinovalerate. The cleavage could also be accomplished by the use of sodium methoxide in benzene to give the methyl-2-acetoximino - 5 - cyanovalerate. These compounds on reduction and hydrolysis are converted to lysine.

In the afore-mentioned methods of acylation utilizing for example the acid chlorides or the sulfonyl chlorides and similar compounds it is well known that there is produced hydrogen chloride as a byproduct. The hydrogen chloride causes decomposition of the diacylated oximes to give dicyano compounds which are valueless for the purpose of producing the desired amino acid. Accordingly, the patent specifies that the acylation be carried out in the presence of an aqueous organic base for the purpose of neutralizing the acid and preventing loss in yield.

In the other method of acylation utilizing acetic anhydride with concentrated sulfuric acid as the catalyst the same problems are encountered; namely, that the acid utilized as the catalyst causes decomposition of the product. Moreover, this reaction is highly exothermic and not only is difficult to control but in addition to the decomposition reactions the presence of the sulfuric acid also caused rearrangement reactions to occur giving products which are valueless for producing the desired amino acid final product. As a result the acylating methods described were subject to important disadvantages which resulted in poor yields of desired product and, consequently, were not commercially feasible.

It has also been proposed to carry out the acylation reaction in the presence of sodium acetate as the catalyst, however, this does not obviate the disadvantages which have been enumerated since this catalyst also causes decomposition of the desired product with attendant loss in yield.

In accordance with the present invention acylation of the 2,6 - dioximinocyclohexanone is carried out easily and simply by the use of ketenes or carboxylic acid anhydrides in the absence of any catalyst to produce the corresponding diacylated derivative which, in turn, by ring cleavage and reduction as described in the aforementioned patents, is converted to lysine.

SUMMARY OF THE INVENTION

This invention relates to a method for the acylation of 2,6 - dioximinocyclohexanone or the monosodium salt thereof by the use of ketene, substituted ketenes, alkyl carboxylic acid anhydrides or aryl dicarboxylic acid anhydrides. Examples of such compounds are ketene, dimethyl ketene, acetic anhydride, benzoic acid anhydride and similar compounds. The acylation is carried out in the complete absence of catalyst to give the corresponding diacylated derivative of the 2,6-dioximinocyclohexanone.

It is an object of this invention therefore to provide a novel method for the acylation of 2,6-dioximinocyclohexanone or the monosodium salt thereof.

It is another object of this invention to provide a method for the acylation of 2,6 - dioximinocyclohexanone and the monosodium salt thereof utilizing certain acylating agents and in the absence of a catalyst.

It is another object of this invention to provide a method for acylating 2,6-dioximinocyclohexanone or the monosodium salt thereof utilizing a ketene or a carboxylic acid anhydride.

Other objects of this invention will be apparent from the following description of the preferred embodiments and from the claims.

DESCRIPTION OF THE PREFERRED EMBODIMENTS

The acylating agents which can be employed in the process of this invention are the ketenes and carboxylic acid anhydrides. Among the ketenes which can be utilized ketene itself, $CH_2=C=O$, is preferred because of its ease of generation from acetone or acetic anhydride. The alkyl substituted ketenes such as the dimethyl derivative, $(CH_3)_2C=C=O$, or diethyl derivative, $$(CH_3CH_2)_2C=C=O$$

are also suitable. Higher derivatives are likewise suitable.

The carboxylic acid anhydrides which can be utilized include the alkyl compounds such as acetic anhydride, propionic anhydride, and the like in which the alkyl group may vary from 1 to 10 carbon atoms. Likewise, mixed alkyl anhydrides can be employed, for example, such as that obtained from acetic acid and propionic acid or the like. These mixed anhydrides are prepared, for example, by heating the higher acids with acetic anhydride. Aryl anhydrides also can be utilized, for example, benzoic acid anhydride, alkyl substituted benzoic acid anhydrides and the like. Likewise, mixed alkyl aryl anhydrides can be employed. In addition cyclic anhydrides such as maleic anhydride, phthalic anhydride, and the like can be used but are not preferred. The most preferred anhydride, however, is acetic anhydride because of its availability and low cost as compared with other anhydrides.

The acylation reaction can be carried out at temperatures ranging from 0° C. to 100° C. Low temperatures of from 0 to 10° C. are preferred when utilizing ketene because of its high reactivity, whereas temperatures in the range of 60° C. to 100° C. are preferred with the carboxylic acid anhydrides.

In the latter case, a very convenient temperature is about 100° C. since this can be obtained by utilizing steam temperatures such as a steam bath. In carrying out the reaction since the 2,6-dioximinocyclohexanone is a solid it is necessary to use a solvent unless the acylating agent itself is a liquid and can act as the solvent. Thus, for example, when ketene which is a gas is utilized as the acylation agent a solvent such as tetrahydrofuran or acetone can be used. If acetic anhydride is utilized as the acylation agent since it is liquid it is unnecessary to utilize an additional solvent, although one can be employed if desired. If acylating with benzoic acid anhydride for example, since it is a solid, a solvent such as acetone or tetrahydrofuran can be utilized. The choice of solvents is not critical although it is preferred, of course, that they be polar and non-reactive with the acylation agent. Thus, for example, methyl ethyl ketone can be utilized or alkyl substituted furans. Such solvents are well known to the art and are not a critical part of the invention. In most instances the choice of solvent is one of economics.

The progress of the reaction can be followed by the formation of a yellow precipitate characteristic of the acylated derivative. When no further formation of a precipitate is observed the reaction is completed. In general, extremely high yields of the acylated derivatives are obtained by this method, i.e. of the order of 90 to 100 percent and commonly from 94 to 98 percent. Since yields of 60 percent by prior art methods were about the maximum obtainable, these yields show the marked advantage of the method of the instant invention.

When acylating with ketenes it is necessary to utilize at least two moles of the ketene per mole of the 2,6-dioximinocyclohexanone, however, a considerable excess is preferred since the ketene is a gas and therefore does not react completely unless exceedingly good contact is provided. When acylating with acid anhydrides, 2 moles of the acylating agent per mole of 2,6-dioximinocyclohexanone is also required for complete acylation, but a slight molar excess such as 2.2:1 can be used.

The reaction is quite rapid with the acid anhydrides, in general from 10 to 20 minutes is sufficient. With the ketenes longer times are required simply because of problems of efficient contacting. In general the time should be sufficient, however, to assure as complete reaction as possible.

The following examples are provided for the purpose of illustrating specific embodiments of the invention and to show the excellent yields which can be obtained. These examples should not be construed, however, as limiting the invention solely to their disclosures.

EXAMPLE I

To a suspension of 10 grams of 2,6-dioximinocyclohexanone in 200 ml. of dry acetone was passed a stream of ketene (and methane) generated by pyrolysis of anhydrous acetone. This was continued for approximately three hours (about 0.3 mole ketene per hour), while the temperature was maintained between about 0 and 10° C. with external cooling utilizing an ice bath. The reaction mixture gradually became homogeneous and then a bright yellow solid precipitated. Filtration gave 2.9 grams of solid and further concentration of the filtrate gave an additional 4.8 grams of the yellow solid. These solids were examined by infrared and the spectra were found to be identical with that of 2,6-diacetoximinocyclohexanone. The remaining filtrate was evaporated under vacuum to dryness and 5.7 grams of the yellow solid, 2,6-diacetoximinocyclohexanone, was obtained. The yield of the acylated derivative was approximately 96 percent of theoretical.

EXAMPLE II

To a suspension of 5.0 grams of 2,6-dioximinocyclohexanone in 100 ml. of tetrahydrofuran was passed a stream of ketene for from 3 to 4 hours (about 0.3 moles per hour). The temperature of the reaction mixture was maintained at 0 to 10° C. by external cooling in an ice bath. The reaction mixture gradually became homogeneous and then a yellow solid precipitated. Filtration gave 3.3 grams of the solid and evaporation of the filtrate gave an additional 4.0 grams. The infrared spectra of both fractions showed that they were the 2,6-diacetoximinocyclohexanone in a yield of about 94 percent.

EXAMPLE III

A flask containing 30 grams of 2,6-dioximinocyclohexanone and 100 ml. of acetic anhydride was heated on a steam bath with occasional shaking for about 15 minutes until the solid had disappeared. The mixture was then allowed to cool and a bright yellow solid precipitated which was collected by filtration. After washing with ethyl ether 35.4 grams of the 2,6-diacetoximinocyclohexanone was obtained. Concentration of the filtrate gave an additional 7.1 grams of the diacetoximinocyclohexanone product. The total yield was about 93 percent.

A similar run was carried out utilizing acetic anhydride and acetone and a yield of 84 weight percent was obtained.

EXAMPLE IV

A run was carried out in which the monosodium salt of 2,6-dioximinocyclohexanone in acetone was reacted with ketene at 0 to 10° C. in the manner described in Example I. The diacetoximinocyclohexanone product was also obtained by this method. When the monosodium salt was reacted with acetic anhydride in the manner described in Example III the diacetoximinocyclohexanone was obtained in a quantitative yield.

EXAMPLE V

Methods were studied for the purification of 2,6-diacetoximinocyclohexanone produced as described above in Examples I through IV. One method involved charcoal purification in chloroform and while this gave a purified product the second method wherein the 2,6-diacetoximinocyclohexanone was recrystallized from glacial acetic acid gave highly superior results. The 2,6-diacetoximinocyclohexanone is soluble only to about 25 grams per liter in the glacial acetic acid at ambient temperatures and therefore this offers an excellent means of purification. The superior results were shown by elemental analysis of the 2,6-diacetoximinocyclohexanone obtained by recrystallization from glacial acetic acid; calculated for $C_{10}H_{12}N_2O_5$: C, 50.00; H, 5.00; N, 11.6. Found: C, 50.22; H, 5.05; N, 11.50.

EXAMPLE VI

To a solution of 1 gram of 2,6-dioximinocyclohexanone in 150 ml. of tetrahydrofuran was added 2.9 grams (two equivalents) of benzoic anhydride. A bright yellow precipitate began to form and this was collected by filtration. This material was identified by melting point and additional analysis (180°–186° C.) as the 2,6-dibenzoximinocyclohexanone. This yield was found to be in excess of 77 percent without additional recovery of compound from the filtrate.

A similar run was carried out utilizing acetone instead of tetrahydrofuran and a yield in excess of 83 percent was obtained.

The foregoing examples demonstrate that the acylation of 2,6-dioximinocyclohexanone and the monosodium salt thereof by the method of this invention can be carried out quickly and easily with extremely high yields to give the desired diacylated product.

I claim:

1. The method of acylating 2,6-dioximinocyclohexanone or the monosodium salt thereof which consists essentially of contacting the said 2,6-dioximinocyclohexanone or monosodium salt thereof with an acylating agent selected from the group consisting of ketene, dimethyl ketene and diethyl ketene in the absence of a catalyst at a temperature in the range of from about 0° C. to 10° C. wherein the mole ratio of said acylating agent to said 2,6-dioximinocyclohexanone or monosodium salt thereof is at least 2:1.

2. The method according to claim 1, wherein the acylating agent is ketene.

References Cited

UNITED STATES PATENTS

| | | |
|---|---|---|
| 2,999,875 | 9/1961 | Ferris et al. _____ 260—566 AE |
| 3,059,018 | 10/1962 | Johnson et al. ____ 260—566 AE |

OTHER REFERENCES

Wagner et al., "Synthetic Organic Chemistry," p. 483 (1953).

JOSEPH E. EVANS, Primary Examiner

G. A. SCHWARTZ, Assistant Examiner

U.S. Cl. X.R.

260—465.5 R, 518 R